No. 662,208. Patented Nov. 20, 1900.
A. VREELAND.
PNEUMATIC TIRE AND SHOE.
(Application filed June 6, 1900.)

(No Model.)

Attest.
L. Lee.
Walter H. Talmage.

Inventor.
Aaron Vreeland, per
Thomas S. Crane, Atty.

THE NORRIS PETERS CO., PHOTO-LITHO., WASHINGTON, D. C.

UNITED STATES PATENT OFFICE.

AARON VREELAND, OF BLOOMFIELD, NEW JERSEY.

PNEUMATIC TIRE AND SHOE.

SPECIFICATION forming part of Letters Patent No. 662,208, dated November 20, 1900.

Application filed June 6, 1900. Serial No. 19,335. (No model.)

*To all whom it may concern:*

Be it known that I, AARON VREELAND, a citizen of the United States, whose residence and post-office address is No. 161 Ashley avenue, Bloomfield, county of Essex, State of New Jersey, have invented certain new and useful Improvements in Pneumatic Tires and Detachable Shoes, fully described and represented in the following specification and the accompanying drawings, forming a part of the same.

The object of the present invention is to furnish a more convenient and practical means of securing a detachable shoe upon the exterior of a pneumatic tire to protect the tire in some degree from puncture and to avoid the slipping of the tire upon muddy roads.

In my construction I form hems upon the edges of the shoe, with a wire in each hem and holes through the margin adjacent to the wires and connect such holes by means of wire links having an open hook at each end adapted to fit through the holes and loop upon the wires. Such links are for brevity termed "hooks" herein and are readily inserted in the holes to engage the wires when the tire is deflated, the inflation of the tire then gripping the hooks and the shoe firmly in place upon the rim of the wheel.

Where it has been attempted to form a shoe from a single strip of canvas or analogous material, the edges of the strip are liable to pucker or gather in an inconvenient manner, and to avoid such puckering I make the shoe preferably of three or more strips of fabric, attached together at their contiguous edges, and the lateral strips are thus bent into the curve of the wheel-rim without restraint of the central strap, which lies upon the tread of the tire.

Where it is required to protect the tire positively from punctures, I apply a series of woven strips separately over the pneumatic bag, with their joints laced at diverse sides of the bag, so that the whole bag is enveloped with several layers of canvas. The outer strip when secured by the hooks, as described above, forms a shoe with unbroken surface upon the tread of the tire, and thus conceals the joints of the inner strips, while it serves to prevent the same from abrasion and displacement.

The invention will be understood by reference to the annexed drawings, in which—

Figure 1:
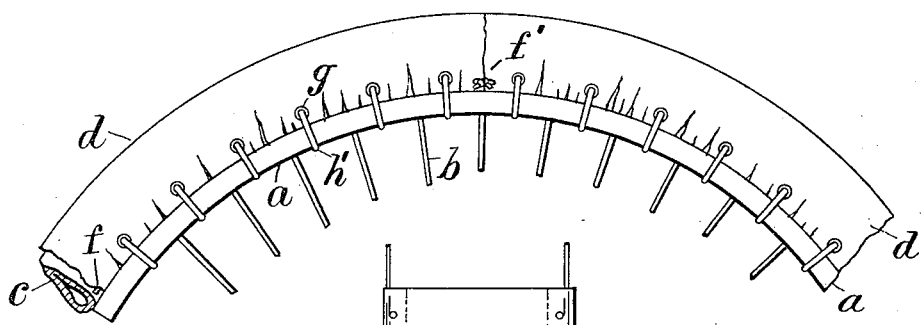
Figure 2:
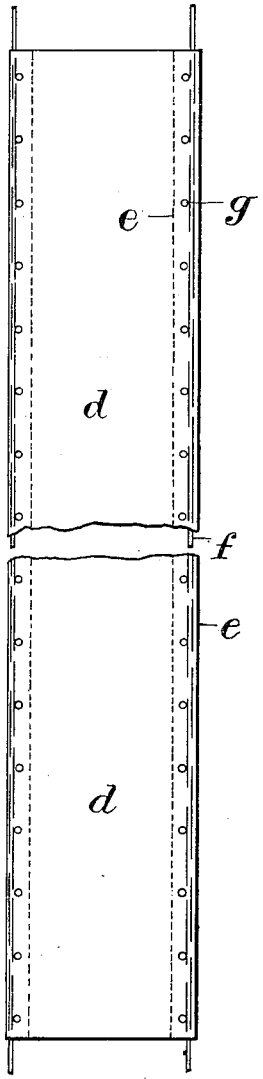
Figure 3:
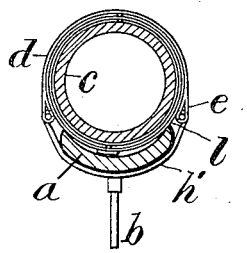
Figure 4:
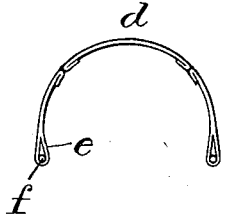

Figure 1 is a side view of a part of vehicle-rim, showing the spokes and tire upon such part, with the shoe applied to the same. Fig. 2 is a plan of the strip for the shoe detached from the tire and broken transversely for want of room upon the drawings. Fig. 3 is a section of the tire and wheel-rim, showing three of the reinforcing-strips and the shoe and bed to the pneumatic bag; and Fig. 4 is an end view of a shoe formed of three longitudinal sections.

$a$ designates the wheel-rim, $b$ the spokes, and $c$ the pneumatic bag.

$d$ is a shoe formed of canvas or other suitable fabric and shown with a hem $e$ in each edge to receive a wire $f$. The shoe shown in Fig. 2 is formed of a single strip of fabric, with holes $g$ along the edge to insert fastenings, the wire lying between the edges of the holes and the bottom of the hem. The ends of the wire may, if desired, be joined, as at $f'$ in Fig. 1, when the shoe is secured upon the face of the tire.

The hooks $h'$ (shown in Fig. 3) are formed of wire pieces, with open hooks at their opposite ends adapted to extend across inside the wheel rim or tire and engage the wire upon the opposite edges of the shoe. Such engagement is readily effected when the tire is deflated, and the inflation of the tire then grips the hooks firmly upon the wires and holds the shoe securely upon the tire.

It is obvious that the edges of the strip where turned inwardly from the periphery of the wheel are longer than the circle upon which they are disposed, and thus tend to form gathers or folds when drawn tight upon the tire.

To obviate the formation of gathers or puckers upon the edge of the shoe, it may for tires of large dimensions, such as are used upon automobile carriages, be made of several strips secured together at their edges, as shown in Fig. 4, where one strip is shown suitable to cover the tread of the tire, and two lateral strips suitable to cover the opposite sides of the tire, and formed each with the hem in the margin to receive the wire $f$.

It is obvious that the shoe secured by the hooks $h'$ may be readily removed by deflating the tire and disengaging the hooks from the holes in the edges of the shoe. The shoe may thus be used upon the tire when the roads are muddy or the tire is most exposed to puncture and readily removed at other times.

Fig. 3 shows the construction to make the tire proof against punctures, four strips $l$ being applied separately to the pneumatic bag within the shoe, each strip being adapted to encompass the bag and having the joints of the several strips arranged alternately at opposite sides of the bag. Such joints would be laced as the strips are applied successively and before the tire is applied to the rim $a$ of the wheel. The shoe $d$ is placed over the series of strips and secured as described above.

My invention furnishes a means of protecting the wheel partly or completely from puncture and furnish a means of readily applying and removing the protective devices.

What I claim, and desire to secure by Letters Patent, is—

1. In a pneumatic vehicle-tire, a detachable shoe consisting of several strips of fabric united at their contiguous edges, and hems upon the edges of the shoe with wires inserted therein and holes at intervals adjacent to the wire, in combination with a series of separate hooks $h'$ adapted at their opposite ends to penetrate the said holes and detachably engage the wires upon the opposite edges of the strip.

2. In a pneumatic vehicle-tire, the combination, with a pneumatic bag, of a series of woven strips applied separately over the bag with their joints laced at diverse sides of the bag, and the outer strips having hems in their margins with wires therein, and the hooks $h'$ adapted at their opposite ends to engage the wires and secure the whole upon the tire.

In testimony whereof I have hereunto set my hand in the presence of two subscribing witnesses.

AARON VREELAND.

Witnesses:
AARON G. CRANE,
THOMAS S. CRANE.